United States Patent
Bschorer

[15] 3,697,041
[45] Oct. 10, 1972

[54] HYDRAULIC CONTROL VALVE HAVING LATERALLY AND ROTATIONALLY DISPLACEABLE VALVE PLATE

[72] Inventor: Konrad Bschorer, Wolfratshausen, Germany

[73] Assignee: Friedrich Deckel Präzisions Mechanik und Maschinenbau, Munich, Germany

[22] Filed: July 8, 1971

[21] Appl. No.: 160,594

[30] Foreign Application Priority Data

July 10, 1970 Germany..........P 20 34 432.5

[52] U.S. Cl. ..............251/3, 137/625.17, 137/625.2, 251/294
[51] Int. Cl. ..........................B23q 35/18, F17d 3/00
[58] Field of Search ...137/625.2, 625.17; 251/3, 294

[56] References Cited

UNITED STATES PATENTS

| | | | |
|---|---|---|---|
| 2,836,387 | 5/1958 | Rosebrook | 251/3 |
| 2,911,182 | 11/1959 | Clarke et al. | 251/3 |
| 3,148,594 | 9/1964 | McCoy | 251/3 X |
| 3,174,403 | 3/1965 | McCoy | 251/3 X |
| 3,331,395 | 7/1967 | Laws | 137/625.2 |
| 3,489,388 | 1/1970 | Bschorer | 251/3 |
| 3,533,444 | 10/1970 | Lyon | 137/625.17 |

*Primary Examiner*—William R. Cline
*Attorney*—Charles Shepard

[57] ABSTRACT

A hydraulic control valve for controlling copying-milling machines and the like. The movements of the associated machine are controlled by moving a valve plate laterally in one direction or another, relative to the fixed valve body. The edges of the associated ports in the valve plate and the valve body are so shaped that by turning the valve plate, a larger or smaller valve port opening will occur for a given extent of lateral movement of the valve plate relative to the body. A pivoted link chain connecting the valve plate to an actuating knob controls the turning movements of the valve plate, and a conventional stylus or tracer connected to the valve plate controls the lateral movements thereof.

9 Claims, 4 Drawing Figures

HYDRAULIC CONTROL VALVE HAVING LATERALLY AND ROTATIONALLY DISPLACEABLE VALVE PLATE

BACKGROUND OF THE INVENTION

This invention relates to a hydraulic control valve, and more particularly a valve of the type which controls the movements of a copying-milling machine. The movements of the valve are usually controlled by a tracer or stylus which moves over a pattern which is to be duplicated, such movements of the tracer serving to move a valve plate or slide in various lateral directions relative to the valve body, thereby altering the openings of various hydraulic ports which control the flow of hydraulic fluid to hydraulic cylinders or hydraulic motors or other suitable hydraulic means for moving the milling machine parts in the desired direction and to the desired extent.

Hydraulic control valves for this same general purpose are well known in the art. Examples are Rosebrook U.S. Pat. No. 2,836,387 of 1958; Clarke U.S. Pat. No. 2,911,182 of 1959; McCoy U.S. Pat. No. 3,148,594 of 1964; McCoy U.S. Pat. No. 3,174,403 of 1965; Laws U.S. Pat. No. 3,331,395 of 1967; and Bschorer (the present applicant) U.S. Pat. No. 3,489,388 of 1970. The present invention may be regarded as an improvement on applicant's said U.S. Pat. No. 3,489,388, and the present disclosure is written on the assumption that the reader is already familiar with applicant's patent, so that the present description may be abbreviated in some respects and need not go into details which would be readily apparent to one who already knows the construction disclosed in applicant's patent.

In applicant's patent, as well as in the present construction, a valve plate slides laterally in any desired direction relative to the valve body, and these lateral movements of the plate serve to alter the flow area of the hydraulic ports, thereby controlling the flow of hydraulic fluid under pressure to the hydraulic motive means (cylinder or rotary motor) of the associated machine tool. In the patent, the valve plate moves only rectilinearly in the desired lateral or radial direction, and is prevented from turning to any significant extent relative to the valve body. Therefore, in the patent, a given lateral (i.e., radial) movement of the plate always results in the same amount of change in the flow area of the ports. In the present invention, as distinguished from the patent, provision is made for an adjusting movement of the valve plate in a rotary direction, and the cooperating edges of the ports in the valve plate and the body are shaped in such a way that a rotary adjusting movement of the plate varies the flow area of the ports for a given lateral movement of the plate relative to the body. Thus it is possible, according to the present invention, to provide for a larger or a smaller change in the flow area of the ports, as a result of a given lateral movement of the valve plate.

This provision for altering the ratio between the lateral movements of the plate and the area changes of the ports, is applicable to valves having positive overlap as well as those having negative overlap where there is always some degree of hydraulic flow through the ports even when the valve plate is in its central or neutral position. Applicant's patent explains why it is desirable, under certain circumstances, to have negative overlap.

The provision for rotary adjusting movement of the valve plate in order to change the flow area of the ports in response to a given lateral movement of the plate, presents the problem of providing convenient means for turning the valve plate in its adjusting movement without causing any undesired lateral movement of the plate during or as a result of the turning movement. The means for turning the plate also must allow for the desired lateral movements of the plate freely in response to pressure on the connected tracer or stylus, and must insure that the desired lateral movements of the valve plate do not cause any further rotary movement thereof. This problem is solved, according to the present invention, by providing a pivoted link chain operatively connecting the valve plate to a rotary adjusting knob.

The capability of increasing or decreasing the flow of hydraulic fluid for a given amount of deflection of the control plate, is a very important feature in the practical operation of a hydraulically controlled machine tool. Too high a speed of the hydraulic drive means, as a result of too great a rate of flow of hydraulic fluid, involves the danger of overswinging, in other words, the danger that the moving part may pass beyond the intended position. However, when the parts are being moved idly to a new position, while no milling is taking place, a fast speed of travel is desirable, to save time. With the present invention, when an idling shift from one position to another is desired, the operator may quickly turn the adjusting knob to rotate the control plate so as to allow for a larger opening of the control ports and therefore a greater flow of hydraulic fluid and a faster movement of the hydraulically moved parts of the machine tool. The larger port adjustment may also be utilized, at times, for faster travel during rough cutting or rough milling operations. But for performing normal milling operations, the operator adjusts the mechanism by turning the control plate of the hydraulic valve to the normal position, where a normal amount of flow through the hydraulic ports occurs in response to a given amount of deflection of the control plate by the stylus or tracer. For very fine or very accurate milling work, the control plate can also be turned to another position where less than the normal amount of flow occurs, for a given deflection of the control plate in a lateral direction.

It is therefore an object of the present invention to provide an improved and more satisfactory hydraulic control valve for machine tools, particularly for copying milling machines, in which the valve can be easily and quickly adjusted to provide for a greater or a lesser volume of flow of hydraulic fluid in response to the same given amount of deflection of the valve control member.

Another object of the invention is the provision of such an adjustable valve with a convenient, inexpensive, and reliable adjusting mechanism whereby the rate of flow for a given deflection may be adjusted without causing deflection of the valve, and whereby the adjusting mechanism does not interfere with the desired operating deflection of the valve control part.

DESCRIPTION OF THE PREFERRED EMBODIMENT

Figures 1, 2:
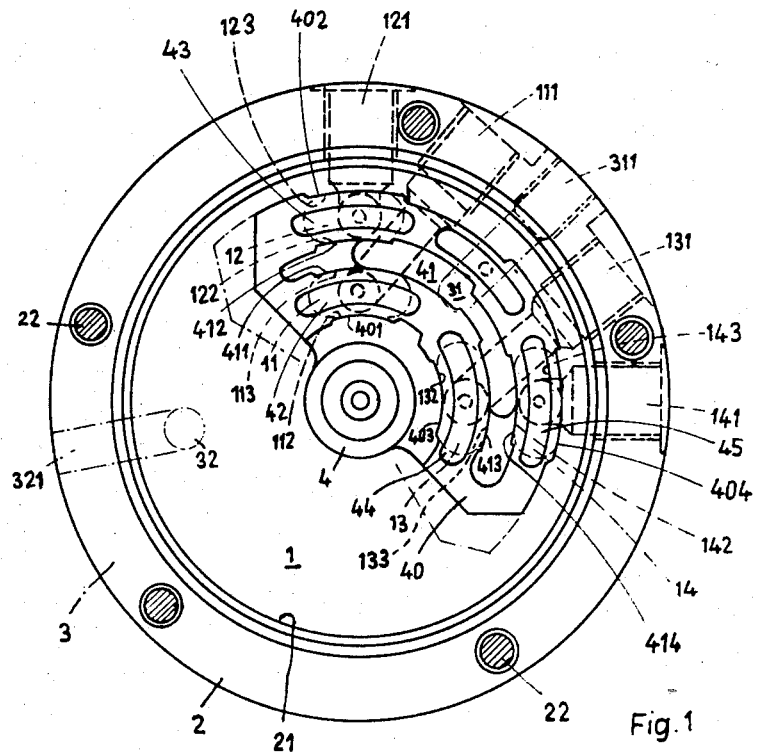
FIG. 1 is a somewhat schematic horizontal section through a hydraulic control valve according to one embodiment of the present invention, showing particularly the shapes of various hydraulic control edges or surfaces.
FIG. 2 is a diagram illustrating different rates of flow as a result of different deflecting movements of the valve plate in different rotary positions of adjustment thereof.

Referring first to FIG. 1, and bearing in mind applicant's prior patent above mentioned, for further details not shown in the present drawings, the control valve body comprises, in general, a bottom plate 1, an intermediate spacer plate 2, and a top plate 3 corresponding in general and functionally to the respective plates 14, 16, and 18 in the prior patent. The intermediate plate 2 is in the form of an annular ring having a large central space or recess 21, in which slides the control plate 4 having a snug sliding fit between the top surface of the bottom plate 1 and the bottom surface of the top plate 3.

The bottom plate 1 contains what may be called connecting openings or ports 11, 12, 13, and 14 respectively connecting with channels 111, 121, 131, and 141 which extend outwardly to the periphery of the valve body, and are there connected to hydraulic lines (not shown) which go in the usual manner to conventional hydraulic motive means, which may be in the form of hydraulically operated rotary motors, or hydraulic cylinders, for causing movement of the desired parts of the conventional machine tool with which this control valve is used. Such machine tool is normally a copying milling machine.

The upper plate 3 has connecting openings or ports 31 and 32 with channels 311 and 321, respectively, for connection to hydraulic fluid lines respectively leading from a suitable conventional source of hydraulic fluid under pressure, and leading to the return reservoir of the fluid pressure source. The plates 1 and 3 are rigidly connected to each other and to the intervening spacer plate 2, by means of struts or connecting pins 22. There is just enough space between the bottom surface of the body plate 3 and the top surface of the body plate 1 for free lateral sliding movement and rotary movement of the control plate 4 which is sandwiched between them.

This control plate 4 contains various grooves or passageways which serve to connect the fluid supply and return ports 31 and 32 in the bottom surface of the top plate 3 to the various ports 11–13 in the top surface of the bottom plate 1, in a manner which will be readily understood by those familiar with applicant's prior patent above mentioned and by those familiar with the actual construction of various hydraulic control valves of this same general type. As readily understood by those skilled in this art, the control plate 4 is displaceable or slidable (to a limited extent, of course) relative to the valve body in any lateral direction; that is, along any radius in any direction from the center of the valve. These lateral sliding movements of the control plate 4, to the extent that they have a component in a direction right or left when viewed as in FIG. 1, will uncover or cover up more or less of the ports connected to the channels 131 and 141, increasing or decreasing the incoming flow of hydraulic fluid under pressure and the return flow of fluid, with respect to those channels. Similarly, to the extent that the lateral displacement of the control plate 4 has a component in a direction up or down when viewed as in FIG. 1, this will vary the flow of fluid through the ports connected to the channels 111 and 121. The various channels and ports in the control plate 4, which cooperate with the ports in the upper and lower plates 3 and 1, include the channel 41 in the region of the fluid inlet opening 31 in the plate 3, and the pockets or channels 42, 43, 44, and 45 arranged in the region of the ports 11, 12, 13, and 14, respectively, of the plate 1.

In applicant's prior patent, the laterally displaceable control plate cannot rotate. But in the prior patent, the control edges or limiting edges of the ports in the laterally displaceable plate are concentric with the central axis of the plate, so that even if the plate could rotate, rotation thereof would not change the relationship between a given amount of lateral displacement and a given amount of opening or closing of the ports. According to the present invention, however, the limiting edges or control edges around the ports or elsewhere on the control plate 4 are made non-concentric with the central axis of the plate, and the plate is mounted for rotation about its central axis so as to be able to adjust the relationship between the amount of lateral displacement and the amount of the port opening or closing produced thereby. This non-concentric relationship of the control edges may be a stepped relationship, or a gradual spiral-like slope of the control edge, the result being the same, that by turning the control plate on its central axis, there is achieved a change in relationship of the control edge to the cooperating edge of the port or channel with which the stepped or sloped control edge coacts for opening or closing the flow area. Merely for the sake of convenient illustration, the control edges are here shown as being stepped, but as above stated a gradual slope or spiral is permissible, instead of an abrupt step.

Figure 3:
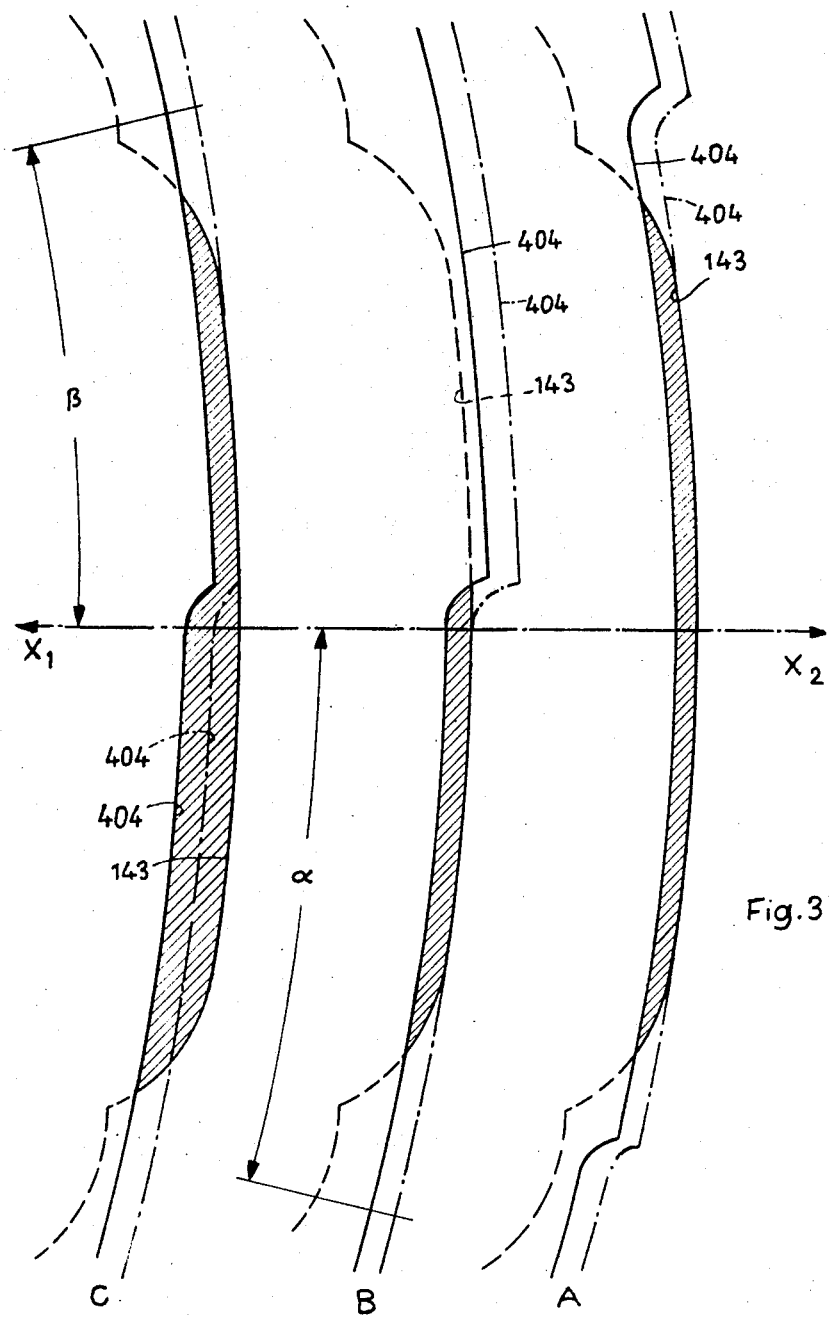
FIG. 3 is a schematic view illustrating various positions of the control edges, on a greatly enlarged scale.

Such control edges of stepped formation on the slidable plate 4 are shown in FIG. 1 at 401, 402, 403, and 404, and also at 411, 412, 413, and 414. Referring now to FIG. 3, a typical one of these edges, 404, is shown schematically on a greatly enlarged scale, in various positions with relation to the cooperating control edge or limiting edge 143 on the plate 1. Referring first to the right hand part of FIG. 3, in the portion marked A, the neutral or undisplaced position of the control edge 404 is shown in dot-dash lines, the control plate carrying this edge being not only in its normal central position so far as lateral displacement is concerned, but also in its normal central position so far as rotation of the plate is concerned. The cooperating limiting edge 143 on the bottom plate 1 is also illustrated. Now let it be assumed that the control plate 4, carrying the edge 404, is moved leftwardly in the direction $X_1$ by means of the tracer or stylus connected in the usual manner to the slide plate 4. The edge 404 on the plate 4 then moves from the position shown in dot-dash lines to the position shown in solid lines, opening up the diagonally cross hatched space between the edges 143 and 404, to permit flow of hydraulic fluid through this area.

Now assume that the entire control plate is rotated clockwise through the angle $\alpha$, thus moving the edge 404 downwardly to the position shown in part B of FIG. 3. As before, the normal undisplaced position of the edge 404 is shown in dot-dash lines. If again the control plate 4 is displaced laterally in the direction of the arrow $X_1$ through the same distance as before, the amount of flow area opened up by this displacement will be only the amount shown by diagonal cross hatching, which is considerably less than the normal amount shown in portion A of FIG. 3. So when the control plate is adjusted to this position, there will be a reduced flow of hydraulic fluid, for a given displacement of the control plate in a lateral direction.

Referring now to the left hand portion C of FIG. 3, let it be assumed that the control plate, instead of being turned clockwise from its normal position, is turned counterclockwise through the angle $\beta$, bringing the control edge 404 to the position illustrated. Again the normal position, without any lateral displacement but with only the rotational displacement of the control edge, is illustrated by dot-dash lines. Now if the control plate is displaced laterally in the direction $X_1$ through the same distance as before, the port area or flow area opened up will be the area which is diagonally cross hatched, and it is seen that this area is considerably greater than the normal flow area produced upon the same lateral displacement when the parts are in the normal adjustment position illustrated at A in FIG. 3.

The control edge 404 has been chosen for illustration merely as an example. The various other non-concentric control edges on the control plate, whether they be of stepped formation or whether they be of sloped or spiral formation, will operate in the same way with respect to their respective limiting or control edges with which they cooperate. In the normal position of rotary adjustment, the cooperating edges will act as in part A of FIG. 3, the edges being so formed as to give a normal rate of flow upon normal lateral displacement, in an amount satisfactory for normal purposes. When a slow or "creeping" movement of the machine tool is desired, for a given displacement of the control plate, as for example when doing very fine or delicate milling work, the control plate is rotated about its axis in a clockwise direction, producing the relationship shown at B in FIG. 3. When a fast movement of the machine tool parts is desired, as in rough milling or more particularly in an idle movement from one position to another position at a substantial distance therefrom, the control plate is turned counterclockwise to produce the relationship shown at C in FIG. 3. The diagram in FIG. 3 illustrates the relationship when the control plate is displaced leftwardly in the direction $X_1$, but of course similar situations occur when the displacement is in the opposite direction and is shown by the arrow $X_2$. The positions shown at B and C in FIG. 3 are only typical positions of rotary adjustment in one direction or the other. Intermediate positions are possible, so that almost an infinite variety of relationship between the control edges is possible. It may be noted also that in the zero position or non-deflected position of the control plate 4, there is a constant small cross-section of flow already present in the undeflected position of the control plate when it is angularly adjusted to this position.

Since there are always two or four control edges and limiting edges cooperating, the reverse effect with respect to the cross-section of flow is obtained in connection with the other pair of edges, functionally associated with the control edges under consideration. Thus for example if a movement in the direction $X_1$ causes the control edge 404 to open a flow space with respect to its associated limiting edge, this same displacing movement will cause the functionally associated control edge 403 to close the flow space with respect to its cooperating limiting edge. The reverse action occurs when the control slide is displaced oppositely, in the direction of the arrow $X_2$.

The manner of operation is further shown in the diagram, FIG. 2. Starting from the zero position O of the control plate 4, the diagram illustrates the change in the cross section of flow Q and dependent thereon the change in quantity of flow, upon the deflection of the control plate 4 in the direction of the arrows $X_1$ and $X_2$ respectively corresponding to the instantaneous angular adjustment in accordance with the positions A, B, and C of FIG. 3. Hydraulic motors or cylinders controlled by means of this hydraulic control valve are driven with slow speed or "crawling speed" when the control plate is in the angular position shown at B in FIG. 3, and are driven at high speed when the control plate is adjusted to the position C. The cross sections of flow $Q_A$, $Q_B$, and $Q_C$ result, corresponding to the instantaneous angular position and the instantaneous degree of deflection of the control plate 4 in the direction $X_1$ or $X_2$.

Figure 4:
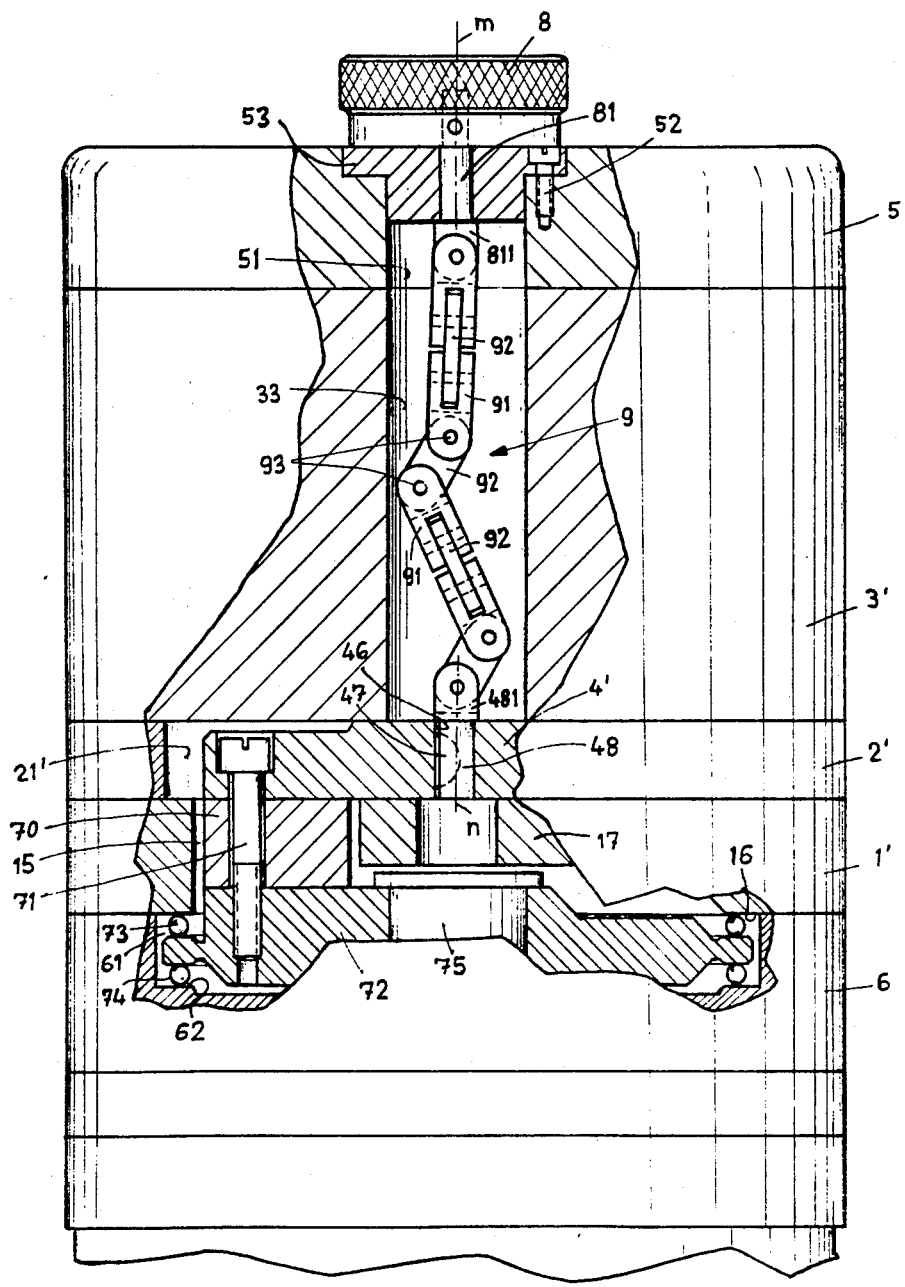
FIG. 4 is a side elevational view of a hydraulic control valve according to the invention, with parts broken away and parts in vertical section, illustrating particularly the adjusting mechanism for adjusting the rotary position of the valve control plate.

FIG. 4 illustrates the mechanism according to the present invention for rotating the control plate 4 to its various adjusted positions. The main valve body as here illustrated in FIG. 4 comprises the plates 1', 2', and 3' corresponding to the previously described plates 1, 2, and 3, together with a top plate 5 and a bottom plate 6. They are held together in sandwich form, and have the illustrated recesses 15, 21', 33, 51, and 61. Within the recess 21' of the plate 2' is the control plate 4', freely movable in a plane in any lateral direction (to a limited extent) and also free to rotate about its central axis.

This control plate 4' is connected through a connecting piece 70 by a screw fastening 71 to a guide plate 72 which is supported for free movement by means of sets of balls 73 and 74 between the axially directed travel surface 62 on the plate 6 and a circular travel surface 16 on the plate 1', so that the control plate 4' is supported and guided by the guide plate 72.

The tracer or stylus member, the upper end of which is shown at 75, is fastened to the guide plate 72, and is thus firmly connected indirectly with the control plate 4'. In the control plate 4' there are the hydraulic channels having control edges, not here shown, such as those illustrated and described in connection with FIGS. 1 and 3, and there are the corresponding connecting channels and connecting openings and limiting edges in the plate 3' or in a disk-shaped section 17 of the plate 1', or in both.

An operating element preferably in the form of a knob 8 manually accessible at the top of the control valve body is supported rotatably in the top plate 5 by means of a bushing 53, held by a screw 52 in the step shaped recess 51. The axis $m$ of the knob 8 remains unchanged, in the common axis of the plates 1' to 6, in which the axis $n$ of the control plate 4' is also located at its zero or undisplaced position. In the control plate 4' there is a shaft journal 48 which is secured against rotation by a keyway 46 and key 47. The knob 8 also has a shaft journal 81 pinned to it to turn with the knob.

Each of the shaft journals 48 and 81 is provided at its end facing toward the other, with a lug 481 and 811 respectively, to which there is pivoted a freely foldable transversely jointed link chain 9, having links 91 and 92 and link pins 93. It is articulated so that in this way the two axes $m$ and $n$, in this case the control plate 4' in its axis $n$ and the fixed rotatable operating element, the knob 8, in its axis $m$, are connected together for rotation. In the case of this setting member, the transversely jointed link chain 9 contains in each of its 2° of freedom, including the link pins 93 at the points of articulation, at least three link pins 93, or two links or a pair of links.

If now the control plate 4' is deflected or displaced in a lateral direction, its axis $n$ moves laterally out of its position coaxial to the axis $m$ and the distance between the two lugs 811 and 481 is increased. This change in distance is counteracted by the stretching of the transversely jointed link chain 9. Upon the return of the control plate 4' to its zero or central position, the transversely jointed link chain again folds up, as shown to an exaggerated extent in FIG. 4.

This type of connection, through a pivoted link chain, serves excellently for the purposes of the present invention, and is free from the drawbacks which would be present in other possible types of rotary connection, such as a telescoping shaft. If a telescoping shaft were used, there would be greater friction than is found in a pivoted link chain of this type, as well as greater expense in manufacture.

Suitable graduations or markings are used on the knob 8 and the top of the plate 5 of the valve body, to indicate the various positions to which the control plate is set upon given rotation of the knob.

What is claimed is:

1. A hydraulic control valve for controlling hydraulic motive means for a machine tool, comprising a valve body member, and a control plate slidable on said body member in any lateral direction from a central position, said body member and control plate having cooperating ports and channels with control edges on said plate cooperating with edges on said member to regulate flow of hydraulic fluid to said motive means in accordance with lateral displacement of said plate from its central position, characterized by the fact that said plate has an axis about which it is rotatable in addition to being laterally displaceable in any direction radially with respect to said axis, and that certain of said control edges on said plate extend in a general direction circumferentially with respect to said axis but in non-concentric relation to said axis, so that by rotating said plate on its axis, different portions of said control edges at different distances from said axis may be brought into cooperative flow-controlling relation to certain edges on said body member, thereby to vary the rate of hydraulic flow permitted by a given lateral displacement of said plate in a given radial direction from a central starting position as compared with the rate of flow permitted by the same lateral displacement in the same radial direction when said control plate is rotated on its axis to a different angular position.

2. A control valve as defined in claim 1, wherein at least some of said non-concentric control edges are of step-like formation.

3. A control valve as defined in claim 1, wherein at least some of said non-concentric control edges are of step-like formation with concentric portions between successive steps.

4. A control valve as defined in claim 1, wherein at least some of said non-concentric control edges have a spiral-like slope.

5. A control valve as defined in claim 1, further including a control knob mounted for rotation about a knob axis in fixed position relative to said body member, the axis of said control plate when in its said central position being substantially in alignment with said knob axis, and torque transmitting means flexible laterally and expansible and contractible longitudinally for operatively connecting said knob to said control plate for rotating said control plate from rotation of said knob regardless of a laterally displaced position of said plate axis with respect to said knob axis.

6. A valve as defined in claim 5, wherein said torque transmitting means is a pivoted link chain.

7. A control valve as defined in claim 1, further including a control knob rotatable about an axis relative to which the axis of said control plate is movable during said lateral movements of said control plate, and torque transmitting means flexible laterally and substantially rigid in a torque-transmitting rotary direction for rotating said control plate from said knob.

8. A control valve as defined in claim 7, wherein said torque transmitting means is a link chain having transverse pivots connecting successive adjacent links to each other.

9. A control valve as defined in claim 8, further including tubular means surrounding said chain and forming a circular bore through which the chain extends, the diameter of said bore being less than the combined extended length of any two successive links of the chain.

* * * * *